United States Patent
Graham (10) Patent No.: US 10,769,952 B2
(45) Date of Patent: Sep. 8, 2020

(54) TURN ASSIST SYSTEM AND METHOD USING DEDICATED SHORT-RANGE COMMUNICATIONS

(71) Applicant: DENSO International America, Inc., Southfield, MI (US)

(72) Inventor: Susan Graham, Solana Beach, CA (US)

(73) Assignee: DENSO International America, Inc., Southfield, MI (US)

(*) Notice: Subject to any disclaimer, the term of this patent is extended or adjusted under 35 U.S.C. 154(b) by 377 days.

(21) Appl. No.: 15/794,099

(22) Filed: Oct. 26, 2017

(65) Prior Publication Data

US 2019/0130753 A1 May 2, 2019

(51) Int. Cl.
*B60Q 9/00* (2006.01)
*G08G 1/0965* (2006.01)
*G08G 1/0967* (2006.01)
*G08G 1/16* (2006.01)

(52) U.S. Cl.
CPC .......... *G08G 1/162* (2013.01); *B60Q 9/008* (2013.01); *G08G 1/0965* (2013.01); *G08G 1/096791* (2013.01); *G08G 1/166* (2013.01); *B60W 2556/65* (2020.02)

(58) Field of Classification Search
CPC .......... B60W 30/0956; B60W 50/14; B60W 30/18154; B60W 2050/143; G08G 1/166; G08G 1/0129; G08G 1/164
USPC ........................................................ 701/301
See application file for complete search history.

(56) References Cited

U.S. PATENT DOCUMENTS

| | | | |
|---|---|---|---|
| 9,251,709 B2* | 2/2016 | Dupont | G08G 1/167 |
| 9,672,734 B1* | 6/2017 | Ratnasingam | H04L 67/12 |
| 2013/0289824 A1* | 10/2013 | Mudalige | G08G 1/167 |
| | | | 701/41 |
| 2016/0185348 A1* | 6/2016 | Miura | B60W 30/0953 |
| | | | 701/41 |
| 2017/0072852 A1* | 3/2017 | Matsuoka | G08G 1/166 |
| 2017/0372612 A1* | 12/2017 | Bai | G08G 1/161 |
| 2018/0308360 A1* | 10/2018 | Regmi | G08G 1/162 |

* cited by examiner

*Primary Examiner* — Behrang Badii
*Assistant Examiner* — Hossam M Abd El Latif
(74) *Attorney, Agent, or Firm* — Harness, Dickey & Pierce, P.L.C.

(57) ABSTRACT

A turn assist system includes a receiver of a primary vehicle that receives travel path data of a remote vehicle. A lane tracking module determines, based on the travel path data of the remote vehicle, whether the remote vehicle will enter an intersection in a nearest lane to the primary vehicle when the primary vehicle is at the intersection in a crossing lane and waiting to enter the intersection into the nearest lane. The determination includes determining whether the remote vehicle will change lanes. The nearest lane is a lane of a multilane road that is closest to the primary vehicle while located in the crossing lane. An alert module notifies a driver of the primary vehicle, in response to the lane tracking module determining that the remote vehicle will enter the intersection in the nearest lane, that it is unsafe to make a turn at the intersection.

20 Claims, 5 Drawing Sheets

TURN ASSIST SYSTEM AND METHOD USING DEDICATED SHORT-RANGE COMMUNICATIONS

FIELD

The present disclosure relates to turn assist systems and methods for a vehicle and, more specifically, to turn assist systems and methods using dedicated short-range communication systems.

BACKGROUND

Various systems exist to assist a driver to make a turn at an intersection. For example, radar and camera systems are used to sense approaching vehicles and to alert the driver when it is not safe to make the turn. Dedicated short-range communication (DSRC) systems may also be used to detect other vehicles having DSRC equipment. Although current turn assist systems are suitable for detecting an approaching vehicle, they do not determine or account for lane changes of the approaching vehicle to determine which lane the approaching vehicle will be in when it enters the intersection.

After stopping at a traffic signal or stop sign, many drivers make a turn onto a multilane road when the nearest lane of the multilane road appears to be clear, even though vehicles are approaching in other lanes adjacent to the nearest lane. However, one or more of vehicles traveling in the lanes adjacent may perform a lane change into the nearest lane, thus potentially causing a collision or necessitating sudden action by the driver.

The driver can typically see the closest vehicle traveling in the adjacent lanes and make a judgement as to whether it is changing lanes. For example, the driver can view the approaching vehicle's heading and/or the status of exterior lights—turn signals. However, the closest approaching vehicle may obstruct the driver's view of additional vehicles traveling in the adjacent lanes or the closest approaching vehicle may change lanes without using a turn signal, thus making it harder for the driver to determine if it is safe to turn into the nearest lane. In addition, the driver may simply not consider whether or not a vehicle is approaching an intersection prior to making a turn into the nearest lane. In any of these situations, the driver may be unaware of the potential threat and may proceed with the turn when conditions are unsafe.

The present teachings provide for an improved turn assist system that addresses the issues with current systems and provides numerous advantages, as explained herein and as one skilled in the art will recognize. For example, the turn assist system of the present teachings is particularly suitable for detecting vehicles that are approaching an intersection in the nearest lane when more than one lane exists and only alerting the driver if it is unsafe to turn into the nearest lane, thereby allowing a driver to safely turn into the nearest lane even while a vehicle in an adjacent lane is approaching the intersection.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A turn assist system includes a receiver of a primary vehicle that receives travel path data of a remote vehicle transmitted by the remote vehicle. A lane tracking module of the primary vehicle determines, based on the travel path data of the remote vehicle, whether the remote vehicle will enter an intersection in a nearest lane to the primary vehicle when the primary vehicle is at the intersection in a crossing lane and waiting to enter the intersection into the nearest lane. The nearest lane is a lane of a multilane road that is closest to the primary vehicle while located in the crossing lane. An alert module of the primary vehicle notifies a driver of the primary vehicle, in response to the lane tracking module determining that the remote vehicle will enter the intersection in the nearest lane, that it is unsafe to make a turn at the intersection. Determining whether the remote vehicle will enter the intersection in the nearest lane includes determining whether the remote vehicle will change lanes prior to entering the intersection. The primary vehicle is traveling in a first direction, the remote vehicle is traveling in a second direction, and the first direction is not parallel to the second direction.

A method includes receiving, by a primary vehicle, travel path data of a remote vehicle transmitted by the remote vehicle. The method also includes determining, based on the travel path data of the remote vehicle, whether the remote vehicle will enter an intersection in a nearest lane to the primary vehicle when the primary vehicle is at the intersection in a crossing lane and waiting to enter the intersection into the nearest lane. The nearest lane is a lane of a multilane road that is closest to the primary vehicle while located in the crossing lane. The method further includes, in response to determining that the remote vehicle will enter the intersection in the nearest lane, notifying a driver of the primary vehicle that it is unsafe to make a turn at the intersection. Determining whether the remote vehicle will enter the intersection in the nearest lane includes determining whether the remote vehicle will change lanes prior to entering the intersection. The primary vehicle is traveling in a first direction, the remote vehicle is traveling in a second direction, and the first direction is not parallel to the second direction.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example embodiments will now be described more fully with reference to the accompanying drawings.

Figure 1:
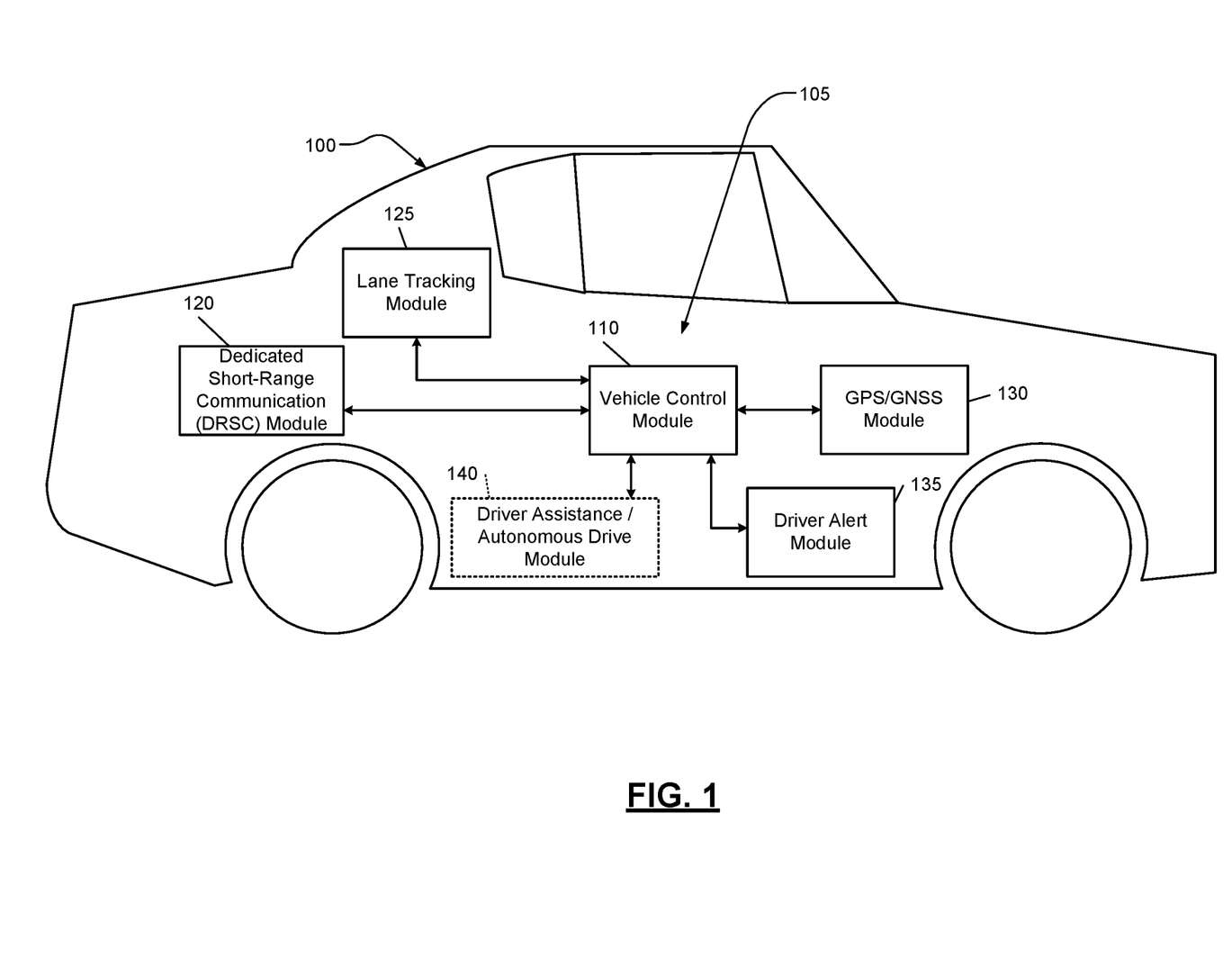
FIG. 1 illustrates an exemplary vehicle including a turn assist system according to the present teachings.

With reference to FIG. 1, a primary vehicle 100 including a turn assist system 105 according to the present teachings is illustrated. Although the primary vehicle 100 is illustrated as an automobile in FIG. 1, the turn assist system 105 can be used with any suitable vehicle, such as any suitable passenger vehicle, mass transit vehicle, commercial vehicle, utility vehicle, etc. The turn assist system 105 is configured to notify a driver of the primary vehicle 100 if it is unsafe to turn at an intersection into a nearest lane of a multilane road. The turn assist system 105 may include a vehicle control module 110, a dedicated short-range communication (DSRC) module 120, a lane tracking module 125, a global positioning system (GPS) or global navigation satellite system (GNSS) module 130, and a driver alert module 135. The turn assist system 105 may also include a driver assistance/autonomous drive module 140. The vehicle control module 110 is configured to control one or more of the DSRC module 120, the lane tracking module 125, the GPS/GNSS module 130, the driver alert module 135, and the driver assistance/autonomous drive module 140.

Figure 2A:
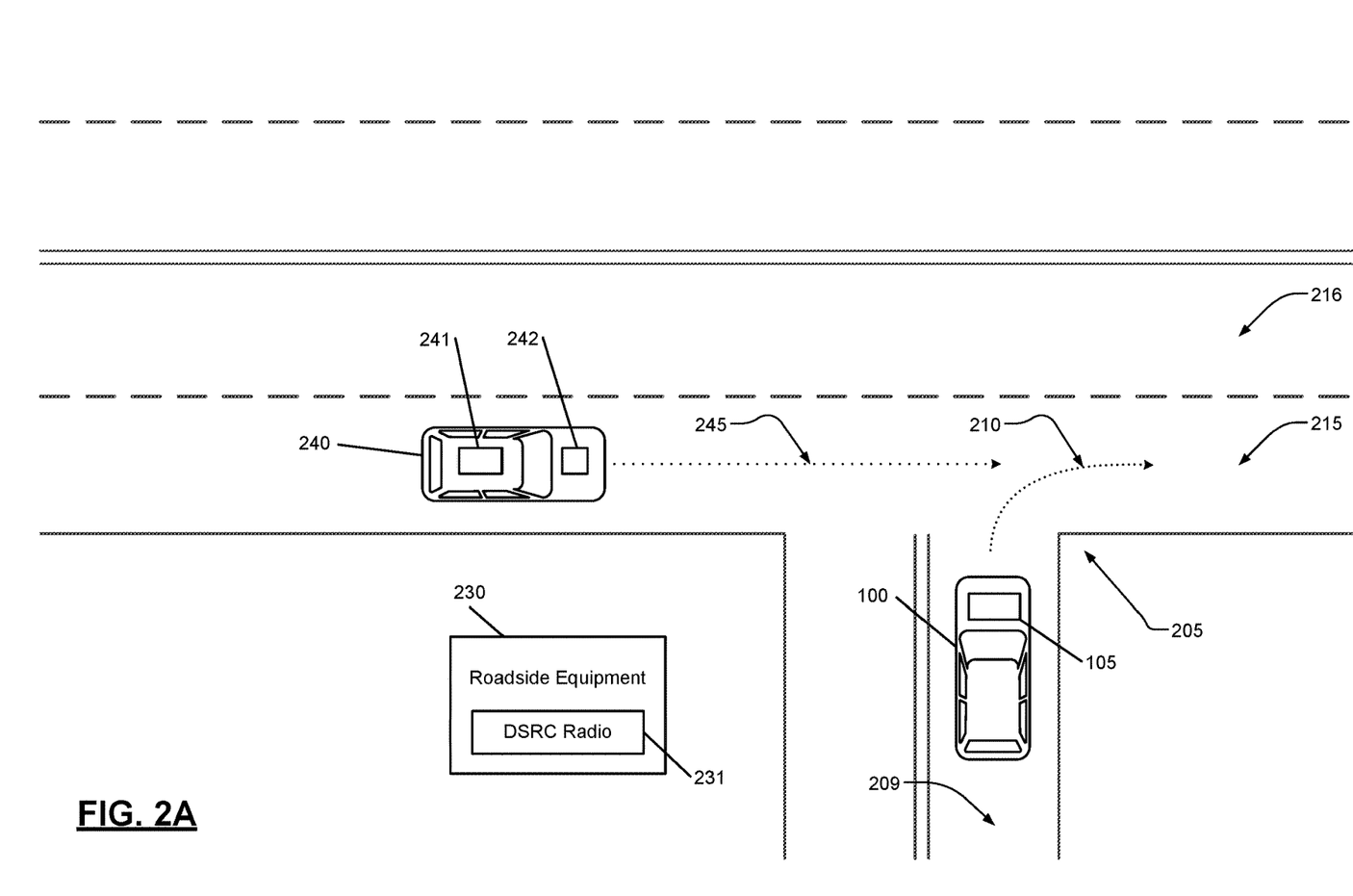
FIGS. 2A, 2B, and 2C illustrate exemplary scenarios in which the turn assist system, according to the present teachings, detects the lane in which a remote vehicle will enter an intersection.
Figure 2B:
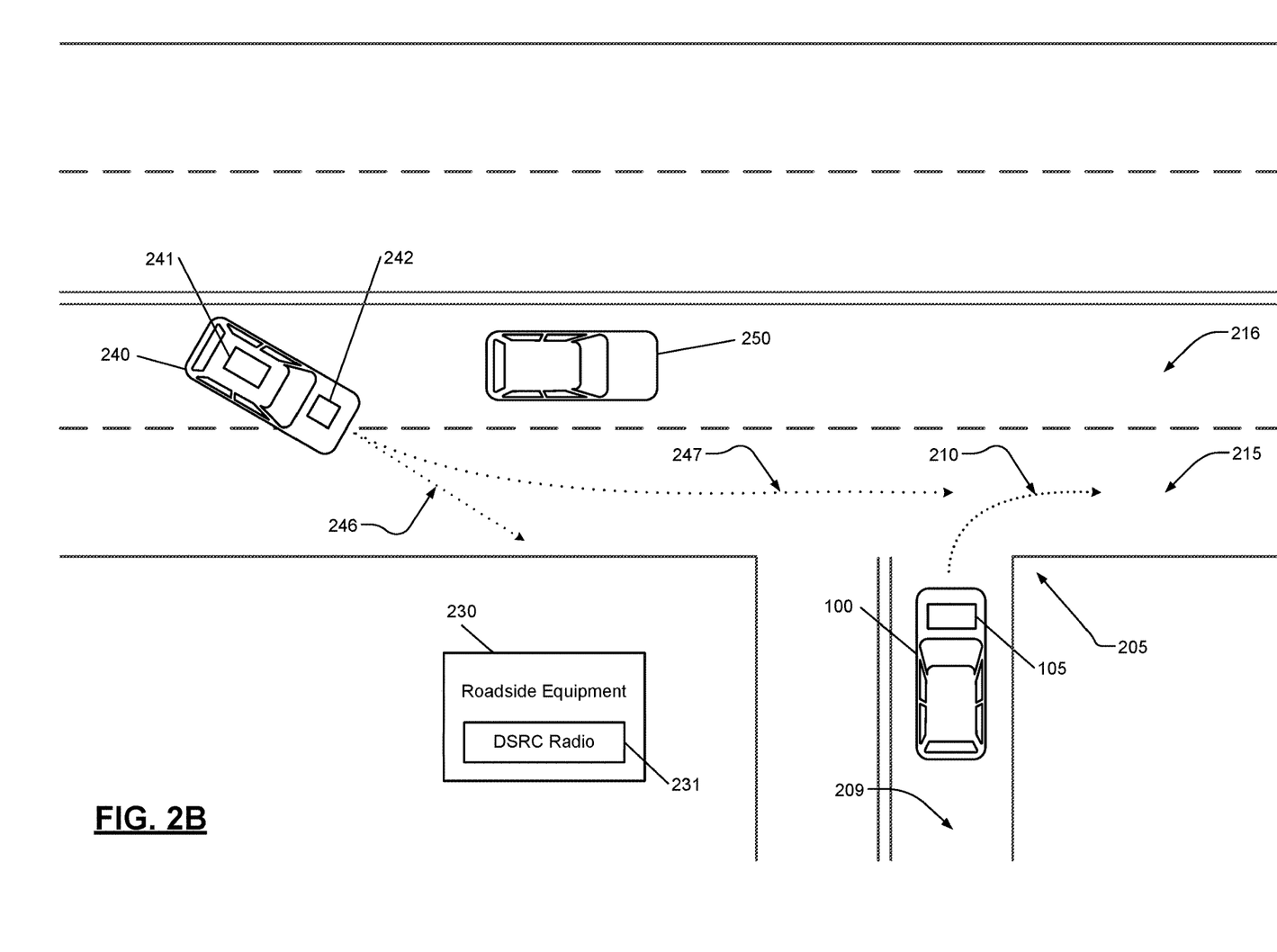
Figure 2C:
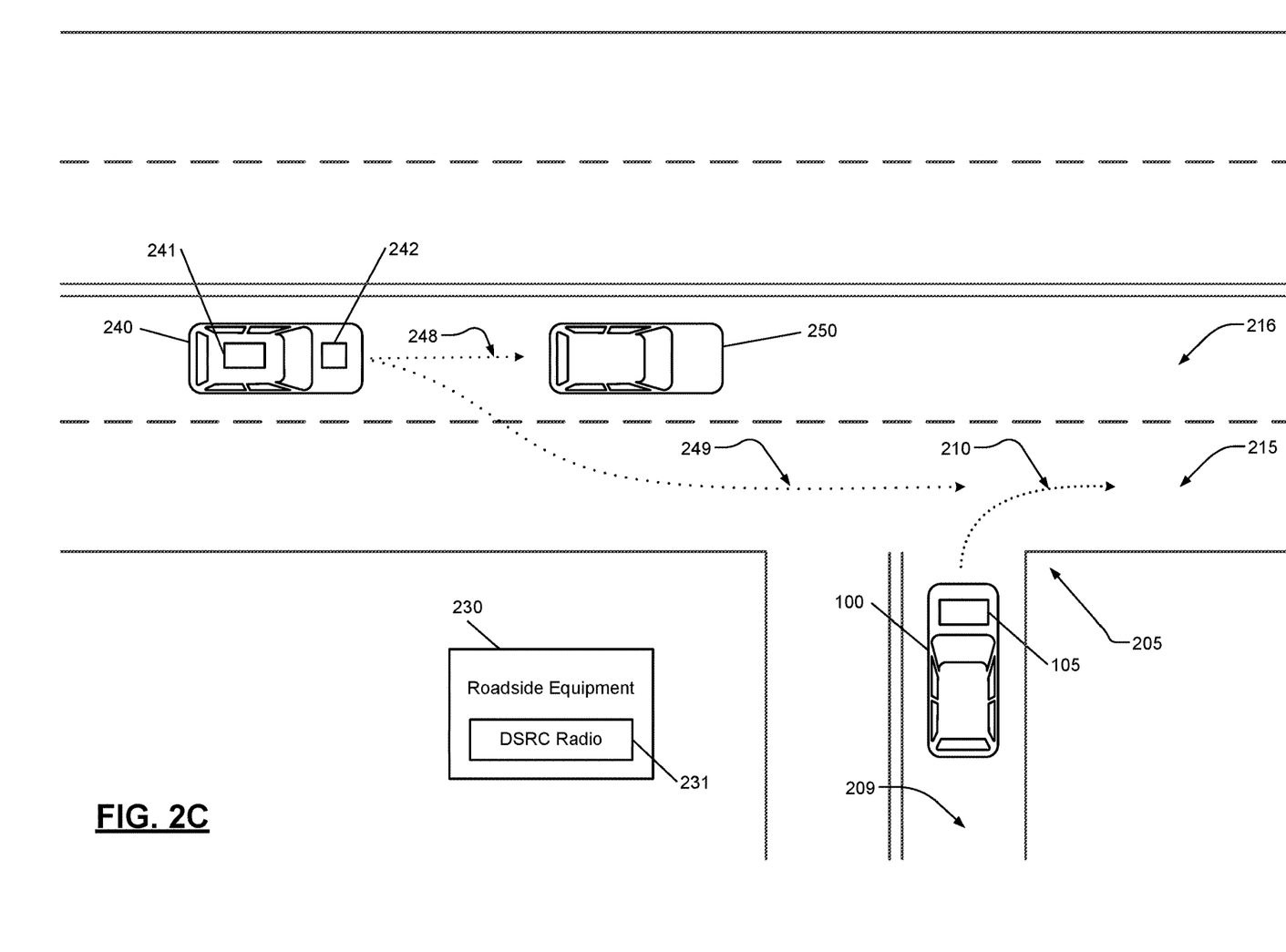

With reference to FIGS. 2A, 2B and 2C, and as discussed in further detail below, the turn assist system 105 is configured to notify a driver of the primary vehicle 100 approaching an intersection 205 in a crossing lane 209 if it is unsafe to make a right turn 210 into a nearest lane 215 based on a travel path data of a remote vehicle 240. The nearest lane 215 is a lane of a multilane road that is closest to the primary vehicle 100 while the primary vehicle 100 is located in the crossing lane 209. An adjacent lane, such as adjacent lane 216, is a lane that (i) is adjacent to the nearest lane and (ii) is not the closest lane to the primary vehicle 100. The turn assist system 105 is configured to alert the driver even when the driver of the primary vehicle 100 may not be able to see the remote vehicle 240 due to the presence of an intermediate (intervening) vehicle 250, or for any other reason.

The primary vehicle 100, which includes turn assist system 105, approaches the intersection 205 in the crossing lane 209 while traveling in a first direction. The remote vehicle 240 approaches the intersection 205 in either the nearest lane 215 or the adjacent lane 216 while traveling in a second direction. The intersection 205 represents an intersection of two right-hand traffic roads—roads where vehicles travel on the right side of the road. The first direction is neither the same as the second direction nor parallel to the second direction. The primary vehicle 100 stops in the crossing lane 209 at the intersection 205. The driver of the primary vehicle 100 may wish to make the right turn 210 into the nearest lane 215 of the intersection 205. The intersection 205 may include roadside equipment 230 with a DSRC radio 231 that broadcasts safety messages. The safety messages may include map data containing information about the layout of the intersection 205. For example, the map data may contain position data (map coordinates) associated with the lanes of the intersection 205, including the nearest lane 215 and the adjacent lane 216.

After the primary vehicle 100 stops at the intersection 205, the turn assist system 105 may use the GPS/GNSS module 130 to determine a current position (map coordinates) of the primary vehicle 100. For example, the vehicle control module 110 is configured to activate the GPS/GNSS module 130 to (i) receive satellite signals and to (ii) determine the current position of the primary vehicle 100 based on the received satellite signals. The vehicle control module 110 sends the current position of the primary vehicle 100 determined by the GPS/GNSS module 130 to the lane tracking module 125.

As illustrated in FIG. 2A, the remote vehicle 240 may be approaching the intersection 205 while traveling in the nearest lane 215. The remote vehicle 240 may include any suitable device or system that is able to track movement of the remote vehicle 240. In one example, the remote vehicle may include a GPS/GNSS 241, which is configured to determine a position (such as map coordinates) of the remote vehicle 240. The remote vehicle 240 further includes a DSRC module 242, which is configured to determine a path prediction of the remote vehicle 240. The path prediction is an estimate of the future travel path of the remote vehicle 240. The DSRC module 242 may determine the path prediction based on at least one of: the current position, the current speed and heading, and/or the yaw rate of the remote vehicle 240. For example, the DSRC module 242 may determine the path prediction based on filtered yaw rate of the remote vehicle 240. The DSRC module 242 is configured to transmit a broadcast safety message that includes travel path data of the remote vehicle 240 to the DSRC module 120 of the primary vehicle 100. With reference to FIG. 2A, the travel path data includes a path prediction 245. The travel path data may also include a current position, a current speed and heading, status of exterior lights, a current steering wheel angle, and/or yaw rate of the remote vehicle 240.

The vehicle control module 110 is configured to control the DSRC module 120 to receive the broadcast safety message being transmitted by the DSRC module 242 of the remote vehicle 240. Based on the travel path data received from the DSRC module 242 of the remote vehicle 240, the turn assist system 105 of the primary vehicle 100 is configured to determine which lane of the intersection 205 the remote vehicle 240 will be in when the remote vehicle 240 enters the intersection 205. The turn assist system 105 is further configured to alert the driver of the primary vehicle 100 in response to determining that the remote vehicle 240 will enter the intersection 205 in the nearest lane 215.

The turn assist system may use the DSRC module 120 to obtain a safety message that is being broadcast by the DSRC radio 231 of the roadside equipment 230. The vehicle control module 110 is configured to control the DSRC module 120 to receive the safety message being broadcast by the DSRC radio 231. The vehicle control module 110 sends the data in the safety message received by the DSRC module 120 to the lane tracking module 125.

In response to determining that the turn assist system 105 has received both a broadcast safety message from the DSRC module 242 of the remote vehicle 240 and a safety message, including map data, from the DSRC radio 231 of the roadside equipment 230, the lane tracking module 125 determines which lane the remote vehicle 240 will enter the intersection 205. The lane tracking module 125 bases the determination both on the travel path data in the broadcast safety message received from the remote vehicle 240 and the position data of the lanes of the intersection 205 received from the roadside equipment 230. The lane tracking module 125 uses the path prediction 245 and at least one of: the current position, the current speed and heading, the status of exterior lights, the current steering wheel angle, and the yaw rate of the remote vehicle 240 to calculate the position that the remote vehicle 240 will be in when the remote vehicle 240 enters the intersection 205. With reference to FIG. 2A, the travel path data included in the broadcast safety message received from the remote vehicle 240 indicates that the turn signals of the remote vehicle 240 are not activated. The lane tracking module 125 determines, based at least on the received data indicating that the turn signals are not activated, that the remote vehicle 240 is not changing lanes. In response to determining that the remote vehicle is not changing lanes, the lane tracking module 125 uses the path prediction 245 to calculate the position that the remote vehicle 240 will be in when the remote vehicle 240 enters the intersection 205. The lane tracking module 125 then compares the calculated position to the position data of the lanes of the intersection 205. As an example, when the calculated position matches position data associated with the nearest lane 215, the lane tracking module 125 determines that the remote vehicle 240 will enter the intersection 205 in the nearest lane 215.

In response to determining that the turn assist system 105 has received only a broadcast safety message from the DSRC module 242 of the remote vehicle 240, i.e. the DSRC module 120 has not received a safety message being broadcast by the DSRC radio 231 of the roadside equipment 230, the lane tracking module 125 determines the lane in which the remote vehicle 240 will enter the intersection 205 based on the travel path data received from the remote vehicle 240, the current position of the primary vehicle 100, and a predetermined default lane width. The predetermined default lane width may be the width of a standard lane. For example, the predetermined default lane width may be 8-12 feet or any other suitable width. The lane tracking module 125 uses the current position of the primary vehicle 100 and the predetermined default lane width to estimate the map coordinates of the lanes of the intersection 205, such as the nearest lane 215 and the adjacent lane 216. In one example, the lane tracking module 125 may estimate the map coordinates of the nearest lane 215 to be the map coordinates within one predetermined default lane width in front of the primary vehicle 100. Further, the lane tracking module 125 may estimate the map coordinates of the adjacent lane 216 to be the map coordinates within two predetermined lane widths but greater than one predetermined lane width in front of the primary vehicle 100. The lane tracking module 125 uses the travel path data included in the broadcast safety message received from the DSRC module 242 to calculate the position that the remote vehicle 240 will be in when the remote vehicle 240 enters the intersection 205. The lane tracking module 125 compares the calculated position to the estimated map coordinates of the nearest lane 215 and the adjacent lane 216 to determine the lane in which the remote vehicle 240 will enter the intersection 205. As an example, when the lane tracking module 125 determines that the calculated position matches a coordinate included in the estimated map coordinates of the nearest lane 215, the lane tracking module 125 determines that the remote vehicle 240 will enter the intersection 205 in the nearest lane 215.

As illustrated in FIGS. 2B and 2C, multiple vehicles, such as the remote vehicle 240 and the intermediate vehicle 250, may be approaching the intersection 205. Both the remote vehicle 240 and the intermediate vehicle 250 may be traveling in the adjacent lane 216. The driver of the primary vehicle 100 may not be able to see the remote vehicle 240 because the intermediate vehicle 250 obstructs the driver's view of the remote vehicle 240. Further, the remote vehicle 240 may change lanes, e.g. move from the adjacent lane 216 to the nearest lane 215, prior to entering the intersection 205.

As illustrated in FIG. 2B, the driver of the remote vehicle 240 may initiate a lane change by moving the steering wheel, thus changing the heading of the remote vehicle 240. With reference to FIG. 2B, the DSRC module 242 transmits a broadcast safety message that includes a path prediction 246 and a current angle of the steering wheel of the remote vehicle 240 to the DSRC module 120 of the primary vehicle 100. The lane tracking module 125 uses the data in the broadcast safety message to calculate the position that the remote vehicle 240 will be in when the remote vehicle 240 enters the intersection 205. The lane tracking module 125 determines, based at least on the received current angle of the steering wheel and the path prediction 246, that the remote vehicle 240 has initiated a lane change. In response to determining that the remote vehicle has initiated a lane change, the lane tracking module 125 calculates an updated path prediction 247. The updated path prediction 247 is an estimate of the future travel path of the remote vehicle 240 after the remote vehicle 240 has completed the lane change. The turn assist system 105 uses the updated path prediction 247 to determine which lane the remote vehicle 240 will enter the intersection 205 in, as described above.

As illustrated in FIG. 2C, the driver of the remote vehicle 240 may initiate a lane change prior to changing the heading of the remote vehicle 240. For example, the driver of the remote vehicle may activate a turn signal to indicate a forthcoming lane change in advance of turning the steering wheel. With reference to FIG. 2C, the DSRC module 242 transmits a broadcast safety message that includes a path prediction 248 and a status of the exterior lights, e.g. turn signals, of the remote vehicle 240 to the DSRC module 120 of the primary vehicle 100. The lane tracking module 125 uses the data in the broadcast safety message to calculate the position that the remote vehicle 240 will be in when the remote vehicle 240 enters the intersection 205. The lane tracking module 125, based at least on the status of the external lights of the remote vehicle 240 and the path prediction 248, determines that the remote vehicle 240 has initiated a lane change. In response to determining that the remote vehicle 240 has initiated a lane change, the lane tracking module 125 calculates an updated path prediction 249. The updated path prediction 249 is an estimate of the future travel path of the remote vehicle 240 after the remote vehicle 240 has completed the lane change. The turn assist system 105 uses the updated path prediction 249 to determine which lane the remote vehicle 240 will enter the intersection 205 in, as described above.

In response to the lane tracking module 125 determining that the remote vehicle 240 will enter the intersection 205 in the nearest lane 215, the vehicle control system activates the driver alert module 135. The driver alert module 135 alerts the driver of the primary vehicle 100 that it is unsafe to turn into the nearest lane 215. The driver alert module 135 may produce any visual and/or audible alert suitable for alerting the driver of the primary vehicle 100. For example, the driver alert module 135 may include a heads-up display, dashboard display, or any other suitable display configured to display a warning to the driver of the primary vehicle 100 that it is unsafe to turn into the nearest lane 215. The driver alert module 135 may also include any suitable audible notification/alert, such as a voice notification, suitable for warning the driver of the primary vehicle 100 that it is unsafe to turn into the nearest lane 215. The driver alert module 135 may be configured to vary the intensity of the alert depending on the speed of the remote vehicle 240 and/or on the distance between the primary vehicle 100 and the remote vehicle 240. In one example, the intensity of the alert is directly proportional to the speed of the remote vehicle 240. In another example, the intensity of the alert is inversely proportional to the distance between the primary vehicle 100 and the remote vehicle 240.

The ability of the turn assist system 105 to alert the driver of the primary vehicle 100 that the remote vehicle 240 will enter the intersection 205 in the nearest lane 215 is particularly advantageous when the driver of the primary vehicle 100 is unable to see the remote vehicle 240 due to an obstruction between the primary vehicle 100 and the remote vehicle 240, such as the presence of the intermediate vehicle 250.

To assist the driver of the primary vehicle 100, the turn assist system 105 may be configured to activate the driver assistance/autonomous drive module 140. Specifically, when the lane tracking module 125 determines that the remote vehicle 240 will enter the intersection 205 in the nearest lane 215, the vehicle control module 110 may activate the driver assistance feature of the driver assistance/autonomous drive module 140. The driver assistance feature of the driver assistance/autonomous drive module 140 is configured to control the steering and/or braking of the primary vehicle 100 to prevent the primary vehicle 100 from turning into the nearest lane 215 of the intersection 205, while maintaining ultimate control of the primary vehicle 100 in the hands of the driver.

Figure 3:
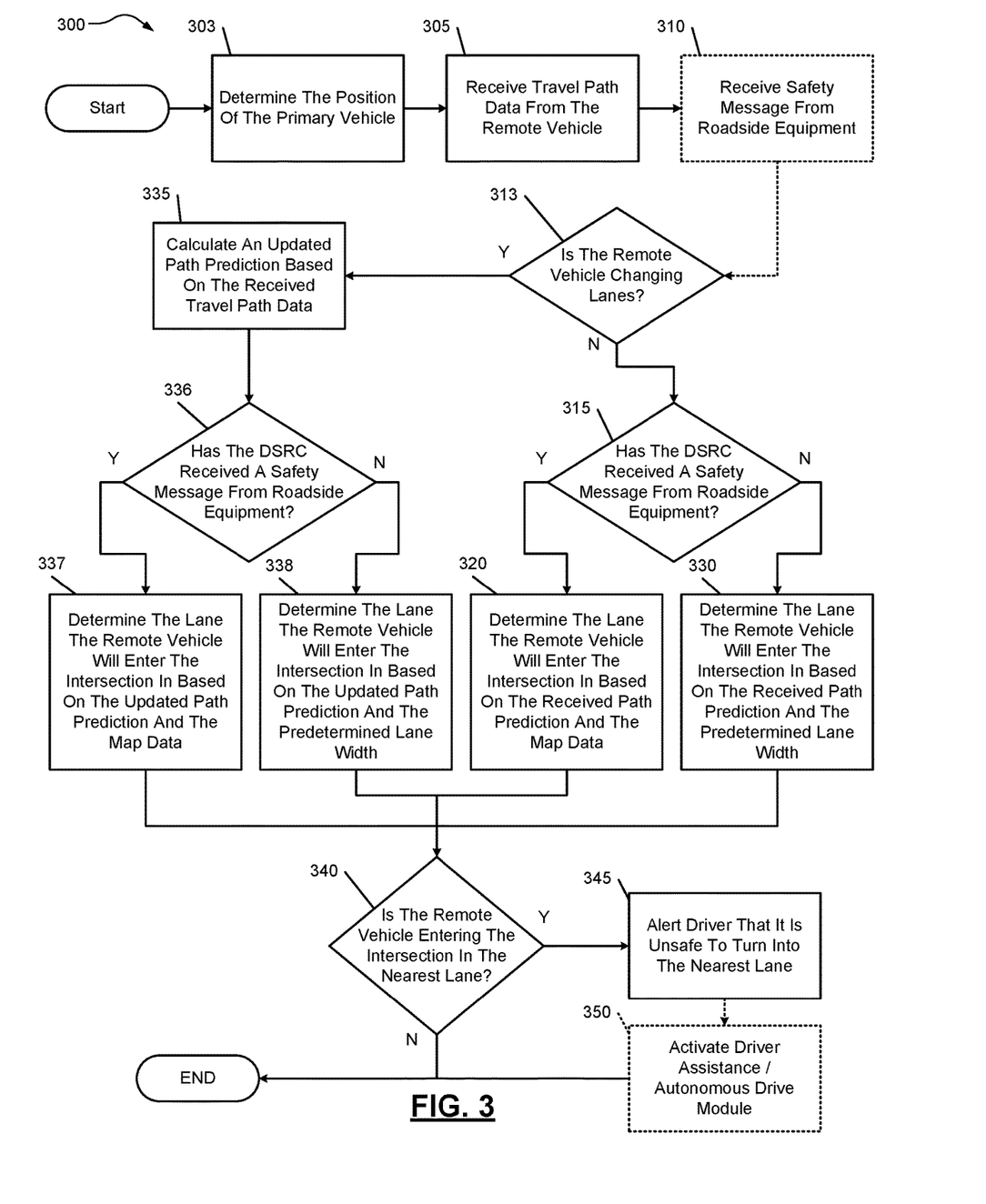
FIG. 3 illustrates a method, according to the present teachings, for alerting a driver of a vehicle entering an intersection in the nearest lane.

With continued reference to FIGS. 1, 2A, 2B, and 2C, and additional reference to FIG. 3, a method according to the present teachings for assisting a driver of the primary vehicle 100 to turn into a nearest lane of an intersection, such as the nearest lane 215 of the intersection 205, is generally illustrated at reference numeral 300. The method 300 can be performed by the turn assist system 105, or by any other suitable system or module.

Control begins at 303 when the primary vehicle 100 stops in the crossing lane 209 at the intersection 205. At 303, the turn assist system 105 may use the GPS/GNSS module 130 to determine a current position of the primary vehicle 100, and control continues with 305.

At 305, the DSRC module 120 of the primary vehicle 100 receives a broadcast safety message, including travel path data, from a vehicle that is approaching the intersection, such as the remote vehicle 240. The travel path data includes a path prediction for the approaching vehicle. The travel path data may also include a current position, a current speed and heading, status of exterior lights, a current steering wheel angle, and/or yaw rate of the approaching vehicle. Control then continues with 310. At 310, if a safety message is being broadcast by roadside equipment 230, the DSRC module 120 of the primary vehicle 100 receives the safety message from the roadside equipment 230 and the vehicle control module 110 sends the data received in the safety message to the lane tracking module 125, and control then continues with 313.

At 313, the lane tracking module 125, based on the received travel path data, determines if the remote vehicle 240 is changing lanes. If 313 is true, control continues with 335, which is discussed further below. If 313 is false, control continues with 315.

At 315, the turn assist system 105 determines if the DSRC module 120 has received a safety message from roadside equipment, such as the roadside equipment 230. If 315 is true, control continues with 320. At 320, the lane tracking module 125, based on the path prediction received from the remote vehicle 240 and the safety message received from the roadside equipment 230, determines the lane in which the remote vehicle 240 will enter the intersection 205. Control then continues with 340, which is discussed further below.

If 315 is false, control continues with 330. At 330, based on the path prediction received from the remote vehicle 240, a predetermined standard lane width, and the current position of the primary vehicle 100, the lane tracking module 125 determines the lane in which the remote vehicle 240 will enter the intersection 205. Control then continues with 340, which is discussed further below.

At 335, the lane tracking module 125 calculates an updated path prediction for the remote vehicle 240 based on the travel path data received from the remote vehicle 240. Control then continues with 336. At 336, the turn assist system 105 determines if the DSRC module 120 has received a safety message from roadside equipment, such as the roadside equipment 230. If 336 is true, control continues with 337. At 337, the lane tracking module 125, based on the updated path prediction for the remote vehicle 240 and the safety message received from the roadside equipment 230, determines the lane in which the remote vehicle 240 will enter the intersection 205. Control then continues with 340, which is discussed further below.

If 336 is false, control continues with 338. At 338, based on the updated path prediction for the remote vehicle 240, a predetermined standard lane width, and the current position of the primary vehicle 100, the lane tracking module 125 determines the lane in which the remote vehicle 240 will enter the intersection 205. Control then continues with 340.

At 340, the lane tracking module 125 determines if the lane the remote vehicle 240 will enter the intersection 205 in is the nearest lane 215. If 340 is false, control ends. If 340 is true, control continues with 345. At 345 the vehicle control system activates the driver alert module 135 to alert the driver of the primary vehicle 100 that it is unsafe to turn into the nearest lane 215. The driver alert module 135 may alert the driver by providing a visual and/or audible alert. In one example, control ends after 345.

In another example, control continues with 350. At 350 the turn assist system 105 uses the driver assistance/autonomous drive module 140, to help the driver of the primary vehicle 100 avoid entering the nearest lane 215 of the intersection 205. For example, the vehicle control module 110 activates the driver assistance feature of the driver assistance/autonomous drive module 140 to control the steering and/or braking of the primary vehicle 100 in a manner that will prevent the primary vehicle 100 from turning into the nearest lane 215.

Although the examples provided above include vehicles traveling on right-hand traffic roads—the primary vehicle 100 is attempting a right turn at the intersection 205 and the remote vehicle 240 is approaching the primary vehicle 100 from a left side of the primary vehicle 100—the present teachings also apply to vehicles traveling on left-hand traffic roads. For example, the turn assist system 105 may be configured to determine which lane of a multilane, left-hand traffic road a remote vehicle approaching a primary vehicle from a right side of the primary vehicle will be in when entering an intersection. The turn assist system 105 may further be configured to alert the driver, in response to determining that the remote vehicle will enter the intersection in the nearest lane of the multilane, left-hand traffic road, that it is unsafe to make a left turn into the nearest lane. Thus, the present teachings, including the turn assist system 105, may be used in vehicles located around the world.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A turn assist system comprising:
a receiver of a primary vehicle configured to receive travel path data of a remote vehicle transmitted by the remote vehicle and map coordinates for a plurality of lanes of a multilane road transmitted by roadside equipment located at an intersection;
a lane tracking module of the primary vehicle configured to, based on the travel path data of the remote vehicle and based on the map coordinates of the plurality of lanes, determine which lane of the multilane road the remote vehicle will be in when the primary vehicle will enter the intersection and determine whether the remote vehicle will be in the intersection in a nearest lane, of the plurality of lanes, to the primary vehicle when the primary vehicle will enter the intersection, while the primary vehicle is at the intersection in a crossing lane and waiting to enter the intersection into the nearest lane, the nearest lane being a lane of the plurality of lanes of the multilane road that is closest to the primary vehicle while located in the crossing lane; and
an alert module of the primary vehicle configured to, based on a result of the determination performed by the lane tracking module, notify a driver of the primary vehicle that it is unsafe to make a turn at the intersection, in response to determining that the remote vehicle will enter the intersection in the nearest lane,
wherein:
determining whether the remote vehicle will enter the intersection in the nearest lane includes determining whether the remote vehicle will change lanes prior to entering the intersection,
the primary vehicle is traveling in a first direction,
the remote vehicle is traveling in a second direction, and
the first direction is not parallel to the second direction.

2. The turn assist system of claim 1, wherein:
the remote vehicle is approaching the primary vehicle from a left side of the primary vehicle; and
the alert module is configured to alert the driver of the primary vehicle that it is unsafe to make a right turn at the intersection.

3. The turn assist system of claim 1, wherein:
the remote vehicle is approaching the primary vehicle from a right side of the primary vehicle; and
the alert module is configured to alert the driver of the primary vehicle that it is unsafe to make a left turn at the intersection.

4. The turn assist system of claim 1, wherein the receiver of the primary vehicle is a dedicated short-range communication (DSRC) module configured to receive the travel path data of the remote vehicle transmitted by DSRC.

5. The turn assist system of claim 1, wherein the travel path data includes at least one of:
a path prediction of the remote vehicle;
a current position of the remote vehicle;
a speed of the remote vehicle;
a heading of the remote vehicle;
a yaw rate of the remote vehicle; and
a status of exterior lights of the remote vehicle.

6. The turn assist system of claim 1, wherein the receiver of the primary vehicle is configured to receive a safety message from the roadside equipment.

7. The turn assist system of claim 6, wherein the safety message includes the map coordinates for the plurality of lanes, including the nearest lane.

8. The turn assist system of claim 1, further comprising:
a global positioning system or global navigation satellite system that communicates with the lane tracking module to provide a position of the primary vehicle.

9. The turn assist system of claim 1, wherein notifying the driver includes at least one of:
producing an audio alert; and
producing a visual alert.

10. The turn assist system of claim 9, wherein an intensity of the audio alert is (i) directly proportional to a speed of the remote vehicle and (ii) inversely proportional to a distance between the primary vehicle and the remote vehicle.

11. A method comprising:
receiving, by a primary vehicle, travel path data of a remote vehicle transmitted by the remote vehicle and map coordinates for a plurality of lanes of a multilane road transmitted by roadside equipment located at an intersection;
determining, based on the travel path data of the remote vehicle and based on the map coordinates of the plurality of lanes, which lane of the multilane road the remote vehicle will be in when the primary vehicle will enter the intersection and whether the remote vehicle will be in the intersection in a nearest lane, of the plurality of lanes, to the primary vehicle when the primary vehicle will enter the intersection, while the primary vehicle is at the intersection in a crossing lane and waiting to enter the intersection into the nearest lane, the nearest lane being a lane of the plurality of lanes of the multilane road that is closest to the primary vehicle while located in the crossing lane; and
in response to determining that the remote vehicle will enter the intersection in the nearest lane, notifying a driver of the primary vehicle that it is unsafe to make a turn at the intersection,
wherein:
determining whether the remote vehicle will enter the intersection in the nearest lane includes determining whether the remote vehicle will change lanes prior to entering the intersection,
the primary vehicle is traveling in a first direction,
the remote vehicle is traveling in a second direction, and
the first direction is not parallel to the second direction.

12. The method of claim 11, wherein:
the remote vehicle is approaching the primary vehicle from a left side of the primary vehicle; and
notifying a driver of the primary vehicle that it is unsafe to make a turn at the intersection includes alerting the driver of the primary vehicle that it is unsafe to make a right turn at the intersection.

13. The method of claim 11, wherein:
the remote vehicle is approaching the primary vehicle from a right side of the primary vehicle; and
notifying a driver of the primary vehicle that it is unsafe to make a turn at the intersection includes alerting the driver of the primary vehicle that it is unsafe to make a left turn at the intersection.

14. The method of claim 11, wherein:
the remote vehicle transmits the travel path data by dedicated short-range communication (DSRC); and
receiving, by a primary vehicle, travel path data of a remote vehicle includes receiving the travel path data using DSRC.

15. The method of claim 11, wherein the travel path data includes at least one of:
a path prediction of the remote vehicle;
a current position of the remote vehicle;
a speed of the remote vehicle;
a heading of the remote vehicle;
a yaw rate of the remote vehicle; and
a status of exterior lights of the remote vehicle.

16. The method of claim 11, further comprising receiving, by the primary vehicle, a safety message from the roadside equipment.

17. The method of claim 16, wherein the safety message includes the map coordinates for the plurality of lanes, including the nearest lane.

18. The method of claim 11, further comprising:
determining, using a global positioning system or global navigation satellite system, a position of the primary vehicle.

19. The method of claim 11, wherein notifying the driver includes at least one of:
producing an audio alert; and
producing a visual alert.

20. The method of claim 19, further comprising:
varying an intensity of the audio alert based on (i) a speed of the remote vehicle and (ii) a distance between the primary vehicle and the remote vehicle,
wherein the intensity of the audio alert is (i) directly proportional to the speed of the remote vehicle and (ii) inversely proportional to the distance between the primary vehicle and the remote vehicle.

* * * * *